Dec. 25, 1928.  
H. D. RINDSBERG  
MOLD  
Filed Sept. 14, 1927

1,696,690

2 Sheets-Sheet 1

Inventor  
Harry D. Rindsberg,  
By Wm. L. Symons  
Attorney

Dec. 25, 1928.　　　　　　　　　　　　　　　　1,696,690
H. D. RINDSBERG
MOLD
Filed Sept. 14, 1927　　　2 Sheets-Sheet 2
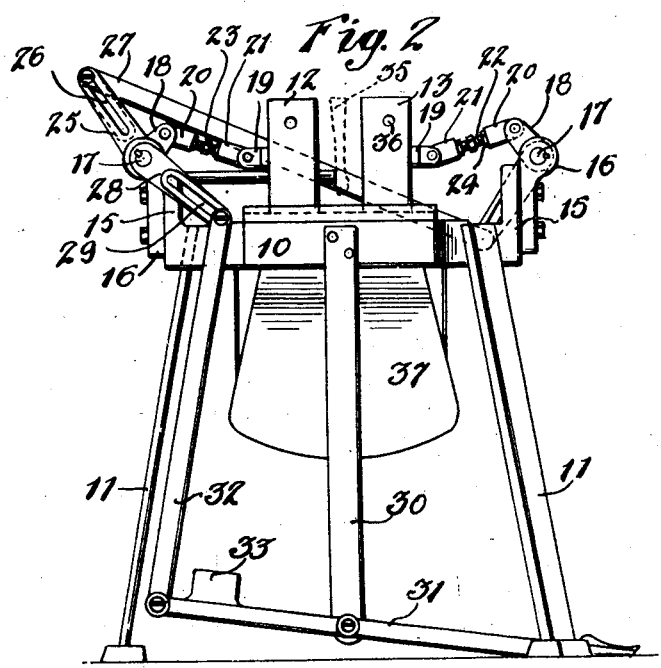
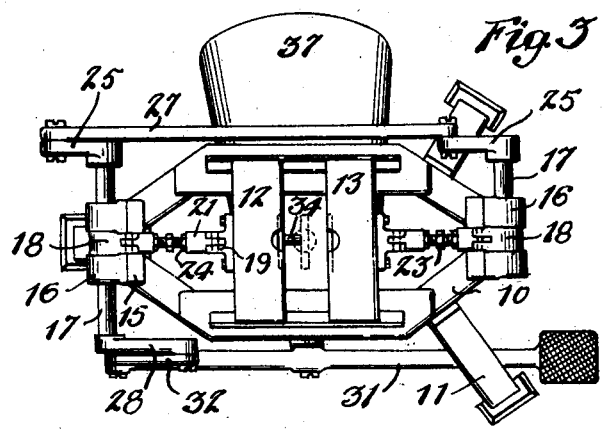
Inventor
Harry D. Rindsberg
By Wm. L. Symons
his Attorney Patented Dec. 25, 1928.

1,696,690

UNITED STATES PATENT OFFICE.

HARRY D. RINDSBERG, OF CINCINNATI, OHIO, ASSIGNOR TO HARRY J. HATER, OF CINCINNATI, OHIO.

MOLD.

Application filed September 14, 1927. Serial No. 219,519.

My invention relates to improvements in molds and more especially to an automatic self-locking permanent metal mold.

An important object of my invention is the provision of a device of the above mentioned character which may be operated by a single person who need not handle the mold in any way.

Another object of my invention is to provide a device of this character which is readily operated and cleaned, and which is simple in construction and operation.

Other objects of my invention will be apparent during the course of the following description.

Figure 1:
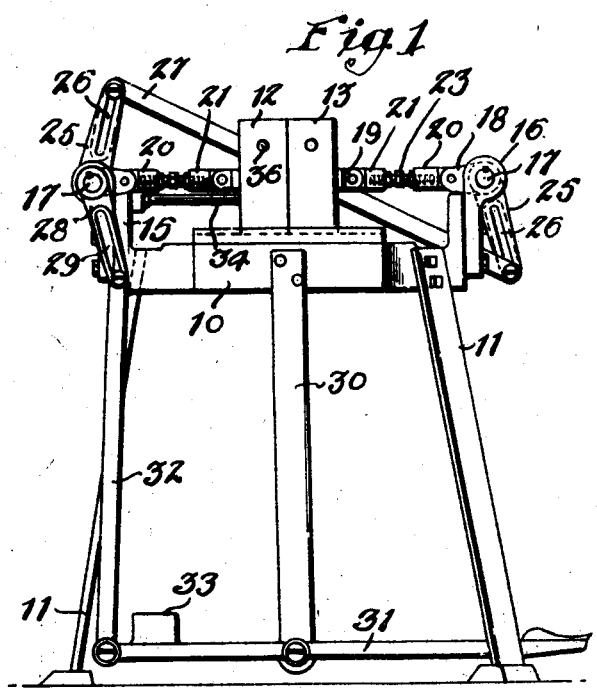
Figure 4:
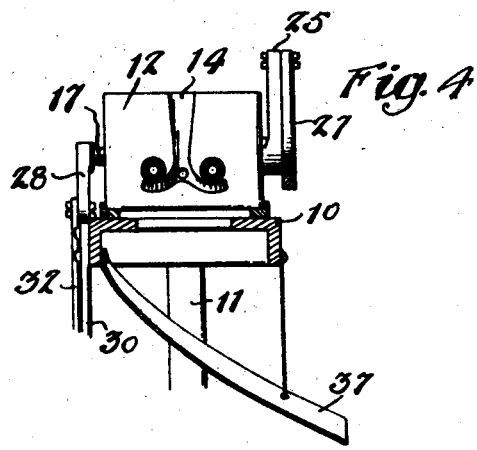

In the accompanying drawings which form a part of this specification, and wherein like characters of reference denote like or corresponding parts throughout the same, Figure 1 is a side elevation of a mold embodying my invention, Figure 2 is a similar view showing the mold in its open position, Figure 3 is a top plan view thereof, and Figure 4 is a vertical transverse sectional view through the center thereof.

In the drawings wherein for the purpose of illustration is shown a preferred embodiment of my invention, the numeral 10 designates the mold base, which is supported by suitable legs 11. A pair of separable mold sections 12 and 13 are mounted on the base 10, as is usual, and the meeting faces of the mold sections are shaped to form the mold cavity 14.

The ends of the mold base are provided with upstanding portions 15 to which brackets 16 are adjustably secured. Rock shafts 17 are journaled in the brackets 16 and are provided with cranks 18 adjacent the center of the mold. Each of the mold sections 12 and 13 are provided on their outer faces with brackets 19, in longitudinal alignment with the crank arms 18. Swivel connections 20 and 21 are pivotally connected to the crank arms 18 and brackets 19, respectively, and are connected by means of screw shafts 22 which enter interiorly screw-threaded depressions in the swivel connections. Adjusting nuts 23 are arranged on the screw shafts 22 to facilitate operation of the same, and nuts 24 are provided adjacent the swivel connections to prevent accidental change of adjustment. It will be seen that turning of the screw shafts 22 by the nuts 23 will lengthen or shorten the distance between the swivel connections 20 and 21 which consequently can be adjusted for different sizes of molds.

Each rock shaft 17 is provided on its end with a crank lever 25, which is provided with a slot 26. A connecting link 27 is adjustably secured to the slots 26 in the levers 25 so that rotation of one of the rock shafts 17 will turn the other.

One of the rock shafts 17 is provided at its other end with a crank lever 28 having a slot 29. A support 30 depends from the base 10 and a foot lever 31 is pivotally secured thereto, adjacent the ground. A link 32 connects the end of the foot lever 31 to the crank lever 28, the connection being rendered adjustable by means of the slot 29. A weight 33 is secured to the foot lever 31 adjacent the link 32.

When the foot lever is depressed, the crank 28 turns its shaft 17, thereby rotating the other shaft 17 through link 27, and separating the mold sections through the medium of the cranks 18, screws 22 and brackets 19, as shown in Figure 2. When the foot lever 31 is released, the weight 33 returns the mold sections to their closed position, as shown in Figure 1.

A casting ejector 34 is removably but rigidly secured to one end 15 of the mold base and extends through the mold section 12. When the mold sections are separated, the section 12 moves relatively to the ejecting pin 34 and the casting 35 is forced out of the mold cavity by the pin 34 and drops through the mold base onto an inclined chute 37 arranged therebeneath, which guides it into any suitable receptacle arranged to one side of the mold.

It will be seen that I have provided a mold which is operated by a foot pedal and which does not require the operator to touch the mold during the molding operation, the sections being returned automatically by the weight 33 and not requiring the attention of the operator. The various links are subject to adjustment and consequently the attachment can be used on any style of mold. In the event that the mold sections require cleaning, they may be swung back around the pivots between the brackets 19 and swivel connections 21 by means of rods or the like inserted in the openings 36 in the sections and the ejector pin 34 may be removed to facilitate cleaning of the mold sections.

While I have shown and described the preferred embodiment of my invention, it is to be understood that various changes in the size, shape and arrangement of parts may be resorted to without departing from the spirit of my invention or the scope of the subjoined claims.

Having thus described my invention, what I claim and desire to protect by Letters Patent is:

1. A mold comprising a base, a pair of separable mold sections thereon, a pair of rock shafts journaled on said base, crank arms on said shafts, means pivotally connecting the crank arms and mold sections, means operatively connecting said rock shafts whereby rotation of one shaft will turn the other, means to turn one of the shafts whereby the crank arms will separate the mold sections, and a weight to automatically return the mold sections to their operative position.

2. A mold comprising a base, a pair of separable mold sections, a pair of rock shafts journaled on said base, crank arms on said rock shafts, links pivotally connecting the crank arms and the mold sections, means whereby the length of said links may be varied, means adjustably connecting the rock shafts whereby rotation of one shaft will turn the other, and means to turn the rock shafts, thereby separating the mold sections.

3. A mold comprising a base, a pair of separable mold sections, a pair of rock shafts journaled on the base, crank arms on said rock shafts, links pivotally connecting the crank arms and mold sections, means to vary the length of the links, means adjustably connecting the rock shafts whereby rotation of one shaft will rotate the other in the opposite direction, a crank lever on one of said shafts, an operating lever pivoted to a portion of the mold frame, a link pivotally and adjustably connecting the crank lever and the operating lever, a weight secured to the operating lever adjacent the link whereby movement of the operating lever will separate the sections, and whereby the weight will return the mold sections when the operating lever is released, and means operable upon the separation of the mold sections for ejecting a casting therefrom.

4. A mold comprising a pair of separable mold sections, a lever, means connecting one of the mold sections with the lever, means operated by the movement of said mold section to cause simultaneous movement of the other mold section in the opposite direction whereby movement of the lever will separate the mold sections, a weight to automatically close the mold sections when the lever is released, and means operable upon the separation of the mold sections for ejecting a casting therefrom.

5. A mold comprising a base, a pair of separable mold sections, a pair of rock shafts journaled on the base, crank arms on said rock shafts, links connecting the crank arms and mold sections, means connecting the rock shafts whereby rotation of one shaft will rotate the other in the opposite direction, a crank lever on one of said shafts, an operating lever pivoted to a portion of the mold frame, a link connecting the crank lever and the operating lever, and a weight secured to the operating lever adjacent the link whereby movement of the operating lever will separate the sections, and whereby the weight will return the mold sections when the operating lever is released.

In testimony whereof I affix my signature.

HARRY D. RINDSBERG.